W. S. Sampson, Grain Vessels.

No. 120,108.    Patented Oct. 17, 1871.

Witnesses:
Geo. N. Mabee
Frank Blockley

Inventor:
W. S. Sampson
per Munn & Co.
Attorneys.

UNITED STATES PATENT OFFICE

WILLIAM S. SAMPSON, OF NEW YORK, N. Y., ASSIGNOR TO HIMSELF, RUTH ANN VAN BUNSCHOTEN, AND HARRIET VAN BUNSCHOTEN, OF SAME PLACE.

IMPROVEMENT IN VENTILATING GRAIN-VESSELS.

Specification forming part of Letters Patent No. 120,108, dated October 17, 1871.

*To all whom it may concern:*

Be it known that I, WILLIAM S. SAMPSON, of the city of New York, in the county and State of New York, have invented new and useful Improvements in Grain-Vessels; and I do hereby declare that the following is a full, clear, and exact description thereof, which will enable others skilled in the art to make and use the same, reference being had to the accompanying drawing forming part of this specification.

The purpose of my invention is to improve upon the common construction of the hulls of grain-vessels, whereby the grain may be more thoroughly aerated and more perfectly preserved. This improvement consists in the peculiar mode of combining and arranging the perforated pipes with their outlets, inlets, and covering-plates.

Figure 1:
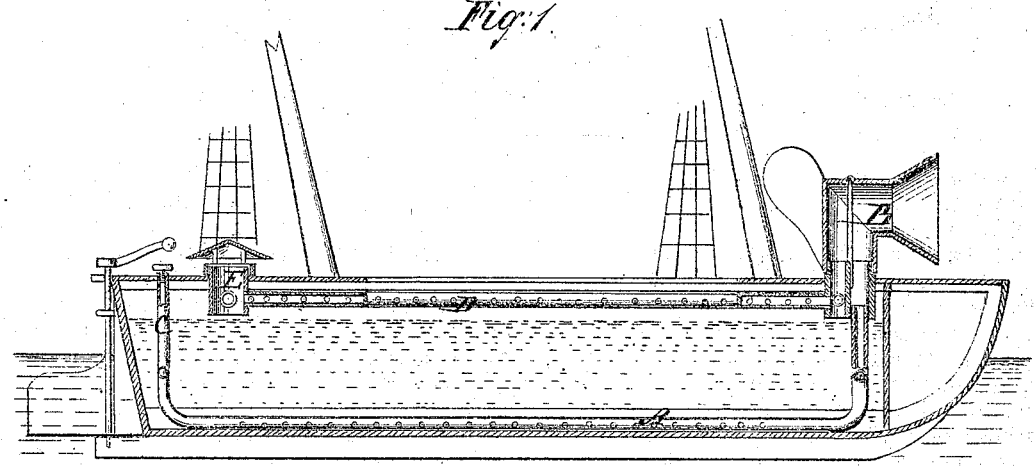
Figure 2:
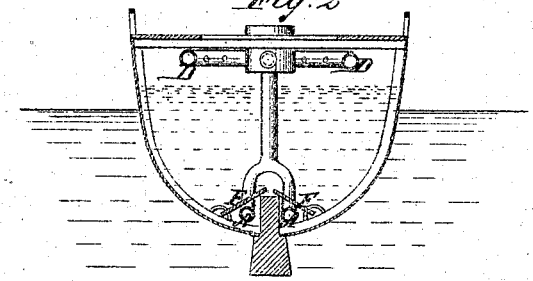
Figure 3:
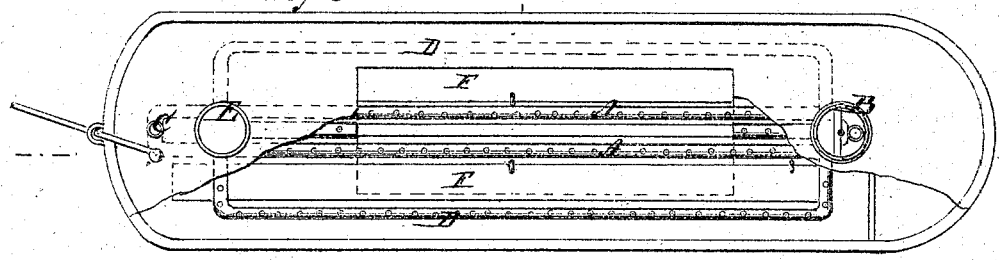

Figure 1 represents a longitudinal sectional elevation of a vessel, arranged to carry out my invention. Fig. 2 is a transverse section; and Fig. 3 is a top view, with the deck partly broken away.

Similar letters of reference indicate corresponding parts.

A represents perforated air-conducting pipes arranged along the bottom of the hold of the vessel from bow to stern, or throughout the length of the grain-holding space, and preferably arranged one on each side of the keelson; but they may be arranged in any approved way. They have a connection at one end, with a funnel-mouthed hood; or it may be with any other suitable natural or artificial means, for causing the air to flow in through the said pipes and escape through the perforations into the grain or other perishable cargo. The other end may have an escape-pipe, C, provided with a stopper, to be opened or not, for permitting the air, or a part of it, to escape thereat, or for inspection of the pipes, or to note the action of the air. D represents another system of perforated pipes, arranged under the deck and connected with the hood B or other supply source, and also provided with a discharge, E at the end opposite where the air is received. The hood is arranged on a pivot to turn to the wind, as is usual in such cases. The discharge E may have a hood arranged to cause a vacuum and produce suction, thereby to accelerate the currents. In this case I have provided covering-plates F for the lower tubes A, to be swung over the said pipes upon the top of the keelson to protect them when other freight, which might injure them, is being carried instead of grain, as on return passages. The air introduced through pipes A, rising up through the cargo to cool it, may be delivered through openings in the deck, or it may be taken up by the pipes D and conveyed away by them, and they may have a current of fresh air coming in through B to facilitate the operation or not; or these pipes D may be used alone in some cases where the grain is comparatively dry, and the air acting on the surface only will be sufficient to preserve the grain.

It will be seen that by this or any equivalent apparatus a current of air may be kept constantly flowing through the bulk of grain or other perishable cargo while in the vessel, and thereby, owing to the effect of the air in maintaining a low temperature, and conveying away the vapors generated by the tendency of all such substances, when confined in large bodies, to fermentation, the grain or other substance will not only be preserved from damage by fermentation, but it will be improved in condition at the same time. This mode of applying the atmospheric air and removing the confined air is also beneficial in a high degree to vessels carrying other freight for preserving the vessel and maintaining a healthful condition in the hold.

It is obvious that any other analogous arrangement of the air-pipes may be used with like results, and I do not, therefore, limit myself to the particular arrangement herein shown; for instance, a series of pipes may be arranged to discharge through nozzles at the bottom or anywhere required; or the whole cargo may rest on a perforated or reticulated bottom, and the air discharged under it.

Having thus described my invention, I claim as new and desire to secure by Letters Patent—

The upper and lower perforated pipes A D, having inlets B, outlets C E, and covering-plates F, when all are constructed and arranged in the hold of a vessel, as described.

The above specification of my invention signed by me this 24th day of May, 1870.

WILLIAM S. SAMPSON.

Witnesses:
GEO. W. MABEE,
L. S. MABEE.

(166)